SYSTEM FOR TRANSMITTING DIGITAL TRAFFIC SIGNALS

Filed Nov. 28, 1966

| 1 | 2 | 3 | 4 | 5 | 6 | | 1 | 2 | 3 | 4 | 5 | 6 | 7 | 8 |
|---|---|---|---|---|---|---|---|---|---|---|---|---|---|---|
| 0 | 0 | 0 | 0 | 0 | 0 | | 0 | 0 | 1 | 1 | 0 | 0 | 1 | 1 |
| 0 | 1 | 0 | 0 | 0 | 0 | | 0 | 0 | 1 | 1 | 1 | 0 | 0 | 1 |
| | | " | | | | | | | | " | | | | |
| | | " | | | | | | | | " | | | | |
| 0 | 1 | 1 | 1 | 1 | 1 | | 0 | 0 | 0 | 1 | 1 | 1 | 0 | 1 |
| 1 | 0 | 0 | 0 | 0 | 0 | | 1 | 1 | 0 | 0 | 1 | 1 | 0 | 0 |
| 1 | 1 | 0 | 0 | 0 | 0 | | 1 | 1 | 0 | 0 | 0 | 1 | 1 | 0 |
| | | " | | | | | | | | " | | | | |
| | | " | | | | | | | | " | | | | |
| 1 | 1 | 1 | 1 | 1 | 1 | | 1 | 1 | 1 | 0 | 0 | 0 | 1 | 0 |

SERVICE SIGNALS:

| | | 1 | 2 | 3 | 4 | 5 | 6 | 7 | 8 |
|---|---|---|---|---|---|---|---|---|---|
| REQUEST FOR REPETITION } | I (RQ)(BQ) | 0 | 1 | 1 | 0 | 1 | 1 | 0 | 0 |
| IDLE TIME { | β | 0 | 1 | 0 | 1 | 0 | 1 | 1 | 0 |
| | α | 1 | 0 | 1 | 0 | 1 | 0 | 0 | 1 |
| | ESCAPE | 1 | 0 | 0 | 1 | 0 | 0 | 1 | 1 |

FIG. 2

| 1 | 2 | 3 | 4 | 5 | 6 | 7 |
|---|---|---|---|---|---|---|
| 1 | 0 | ALL THE SIGNALS OF FIG. 1 | | | | |
| 1 | 1 | " | " | " | " | " |
| 0 | 1 | " | " | " | " | " |
| 0 | 0 | " | " | " | " | " |

| 1 | 2 | 3 | 4 | 5 | 6 | 7 | 8 | 9 | 10 |
|---|---|---|---|---|---|---|---|---|---|
| 0 | 1 | 0 | CONVERSION | AS | IN | FIG. 1 | NORMAL | | |
| 0 | 1 | 1 | " | " | " | " | INVERTED | | |
| 1 | 0 | 1 | " | " | " | " | " | | |
| 1 | 0 | 0 | " | " | " | " | NORMAL | | |

FIG. 3

| 1 | 2 | 3 | 4 | 5 | 6 | 7 | 8 |
|---|---|---|---|---|---|---|---|
| 0 | 0 | 0 | ALL THE SIGNALS OF FIG. 1 | | | | |
| 1 | 0 | 0 | " | " | " | " | " |
| 0 | 1 | 0 | " | " | " | " | " |
| 1 | 1 | 0 | " | " | " | " | " |
| 0 | 0 | 1 | " | " | " | " | " |
| 1 | 0 | 1 | " | " | " | " | " |
| 0 | 1 | 1 | " | " | " | " | " |
| 1 | 1 | 1 | " | " | " | " | " |

| 1 | 2 | 3 | 4 | 5 | 6 | 7 | 8 | 9 | 10 | 11 |
|---|---|---|---|---|---|---|---|---|---|---|
| 1 | 0 | 0 | 0 | CONVERSION | AS | IN | FIG. 1 | NORMAL | | |
| 0 | 1 | 0 | 0 | " | " | " | " | " | | |
| 0 | 0 | 1 | 0 | " | " | " | " | " | | |
| 0 | 1 | 1 | 0 | " | " | " | " | INVERTED | | |
| 1 | 0 | 0 | 1 | " | " | " | " | " | | |
| 0 | 1 | 0 | 1 | " | " | " | " | " | | |
| 0 | 0 | 1 | 1 | " | " | " | " | " | | |
| 1 | 1 | 0 | 0 | " | " | " | " | " | | |

FIG. 4

INVENTORS
H. C. A. VAN DUUREN
H. DA SILVA
BY Hugh A. Hinle
ATTORNEY

Sept. 8, 1970 H. C. A. VAN DUUREN ET AL 3,528,057

SYSTEM FOR TRANSMITTING DIGITAL TRAFFIC SIGNALS

Filed Nov. 28, 1966 5 Sheets-Sheet 1

TABLE 1

COLUMNS IB

| 1 | 2 | 3 | 4 | 5 | | 1 | 2 | 3 | 4 | 5 | 6 | 7 |
|---|---|---|---|---|---|---|---|---|---|---|---|---|
| 0 | 0 | 0 | 0 | 0 | X | 0 | 1 | 1 | 0 | 0 | 1 | 1 |
| 1 | 0 | 0 | 0 | 0 | X | 0 | 1 | 1 | 1 | 0 | 0 | 1 |
| 0 | 1 | 0 | 0 | 0 | X | 0 | 1 | 1 | 0 | 1 | 0 | 1 |
| 1 | 1 | 0 | 0 | 0 | | 1 | 1 | 1 | 0 | 0 | 0 | 1 |
| 0 | 0 | 1 | 0 | 0 | X | 0 | 1 | 0 | 1 | 0 | 1 | 1 |
| 1 | 0 | 1 | 0 | 0 | | 1 | 1 | 0 | 1 | 0 | 0 | 1 |
| 0 | 1 | 1 | 0 | 0 | | 1 | 0 | 1 | 1 | 0 | 0 | 1 |
| 1 | 1 | 1 | 0 | 0 | | 1 | 1 | 1 | 1 | 0 | 0 | 0 |
| 0 | 0 | 0 | 1 | 0 | X | 0 | 1 | 0 | 0 | 1 | 1 | 1 |
| 1 | 0 | 0 | 1 | 0 | | 1 | 1 | 0 | 0 | 1 | 0 | 1 |
| 0 | 1 | 0 | 1 | 0 | | 1 | 0 | 1 | 0 | 1 | 0 | 1 |
| 1 | 1 | 0 | 1 | 0 | | 1 | 1 | 1 | 0 | 1 | 0 | 0 |
| 0 | 0 | 1 | 1 | 0 | | 1 | 0 | 0 | 1 | 1 | 0 | 1 |
| 1 | 0 | 1 | 1 | 0 | XX | 0 | 1 | 0 | 1 | 1 | 0 | 1 |
| 0 | 1 | 1 | 1 | 0 | | 1 | 0 | 1 | 1 | 1 | 0 | 0 |
| 1 | 1 | 1 | 1 | 0 | XX | 0 | 1 | 1 | 1 | 1 | 0 | 0 |
| 0 | 0 | 0 | 0 | 1 | X | 0 | 0 | 1 | 1 | 0 | 1 | 1 |
| 1 | 0 | 0 | 0 | 1 | | 1 | 1 | 0 | 0 | 0 | 1 | 1 |
| 0 | 1 | 0 | 0 | 1 | | 1 | 0 | 1 | 0 | 0 | 1 | 1 |
| 1 | 1 | 0 | 0 | 1 | | 1 | 1 | 1 | 0 | 0 | 1 | 0 |
| 0 | 0 | 1 | 0 | 1 | | 1 | 0 | 0 | 1 | 0 | 1 | 1 |
| 1 | 0 | 1 | 0 | 1 | | 1 | 1 | 0 | 1 | 0 | 1 | 0 |
| 0 | 1 | 1 | 0 | 1 | | 1 | 0 | 1 | 1 | 0 | 1 | 0 |
| 1 | 1 | 1 | 0 | 1 | XX | 0 | 1 | 1 | 1 | 0 | 1 | 0 |
| 0 | 0 | 0 | 1 | 1 | | 1 | 0 | 0 | 0 | 1 | 1 | 1 |
| 1 | 0 | 0 | 1 | 1 | | 1 | 1 | 0 | 0 | 1 | 1 | 0 |
| 0 | 1 | 0 | 1 | 1 | XX | 0 | 0 | 1 | 0 | 1 | 1 | 1 |
| 1 | 1 | 0 | 1 | 1 | XX | 0 | 1 | 1 | 0 | 1 | 1 | 0 |
| 0 | 0 | 1 | 1 | 1 | | 1 | 0 | 0 | 1 | 1 | 1 | 0 |
| 1 | 0 | 1 | 1 | 1 | XX | 0 | 1 | 0 | 1 | 1 | 1 | 0 |
| 0 | 1 | 1 | 1 | 1 | XX | 0 | 0 | 1 | 1 | 1 | 1 | 0 |
| 1 | 1 | 1 | 1 | 1 | X | 0 | 0 | 1 | 1 | 1 | 0 | 1 |

SERVICE SIGNALS:

| | | 1 | 2 | 3 | 4 | 5 | 6 | 7 |
|---|---|---|---|---|---|---|---|---|
| REQUEST FOR REPETITION | "I"(RQ)(BQ) | 1 | 1 | 0 | 1 | 1 | 0 | 0 |
| IDLE TIME | β | 1 | 0 | 1 | 0 | 1 | 1 | 0 |
| | α | 0 | 0 | 0 | 1 | 1 | 1 | 1 |

FIG. 1

TABLE 2

| EXCEPTIONS | | | | | NEW SIGNALS | | | | |
|---|---|---|---|---|---|---|---|---|---|
| 0 | 0 | 0 | 0 | 0 | 1 | 1 | 0 | 0 | 1 |
| 1 | 0 | 0 | 0 | 0 | 1 | 1 | 1 | 0 | 0 |
| 0 | 1 | 0 | 0 | 0 | 1 | 1 | 0 | 1 | 0 |
| 0 | 0 | 1 | 0 | 0 | 1 | 0 | 1 | 0 | 1 |
| 0 | 0 | 0 | 1 | 0 | 1 | 0 | 0 | 1 | 1 |
| 0 | 0 | 0 | 0 | 1 | 0 | 1 | 1 | 0 | 1 |
| 1 | 1 | 1 | 1 | 1 | 0 | 1 | 1 | 1 | 0 |

TABLE 3

| | | | | |
|---|---|---|---|---|
| 1 | 0 | 1 | 1 | 0 |
| 1 | 1 | 1 | 1 | 0 |
| 1 | 1 | 1 | 0 | 1 |
| 0 | 1 | 0 | 1 | 1 |
| 1 | 1 | 0 | 1 | 1 |
| 1 | 0 | 1 | 1 | 1 |
| 0 | 1 | 1 | 1 | 1 |

INVENTORS
H. C. A. VAN DUUREN
H. DA SILVA
BY
ATTORNEY

INVENTORS
H. C. A. VAN DUUREN
H. DA SILVA
BY Hugh A. Kirk
ATTORNEY

SYSTEM FOR TRANSMITTING DIGITAL TRAFFIC SIGNALS

INVENTORS
H. C. A. VAN DUUREN
H. DA SILVA
BY
[signature]
ATTORNEY

INVENTORS
H. C. A. VAN DUUREN
H. DA SILVA
BY Hugh Kirk
ATTORNEY

United States Patent Office 3,528,057

Patented Sept. 8, 1970

3,528,057

SYSTEM FOR TRANSMITTING DIGITAL TRAFFIC SIGNALS

Hendrik Cornelis Anthony van Duuren, Wassenaar, and Herman da Silva, Voorburg, Netherlands, assignors to De Staat der Nederlanden, Ten Deze Vertegenwoordigd Door de Directeur-Generaal der Posterijen, Telegrafie en Telefonie, The Hague, Netherlands Filed Nov. 28, 1966, Ser. No. 597,375

Claims priority, application Netherlands, Dec. 3, 1965, 6515723

Int. Cl. H04l *1/10;* H03k *13/32*

U.S. Cl. 340—146.1 4 Claims

ABSTRACT OF THE DISCLOSURE

A system for transmitting digital traffic signals, particularly data transmission system by converting any one of a plurality of multiunit codes on a uniform basis into corresponding constant ratio codes, and providing means for detecting and correcting errors by automatically repeating the signals received incorrect. Such a system includes a transmitting station and a receiving station with means at each station for converting the codes, storing devices and shift registers for code signals, means for correcting the phase of the elements of the codes, means for dividing signals into groups or cycles and counting these cycles to prevent loss or duplication of signals, blocking devices, and special code signal generators and detectors for requesting repetitions and denoting starts of system and repetition cycles.

RELATED APPLICATIONS

Netherlands patent application Ser. No. 6,515,723 filed Dec. 3, 1965 from which the present application claims priority.

BACKGROUND OF THE INVENTION

Data transmission can be effected by means of five-, six-, seven- or eight-unit codes, which are non-protecting codes, or by protecting codes in which the signals transmitted exhibit a constant ratio of 0-bits and 1-bits.

Further it is known that in some telegraph transmission systems in which the telegraphic speed is 50 bauds, a start polarity of more than 120 milliseconds duration (i.e. six 0-bits) is considered as a clearing signal, causing the connection to be released.

Telegraph transmission also uses a so-called system cycle consisting in a recurrent inversion pattern, the signals of a message being transmitted in groups of a specified number of signals, each of which groups exhibits a fixed pattern of normal and inverted transmission, which pattern continuously repeats itself in the sequence of groups.

This system cycle prevents the loss of signals or prevents signals from being printed twice when the system is rephased after longer periods of repetition. It is also known, in certain cases when a repetition cycle occurs, to transmit service signals, called "I"-signals, in accordance with such an inversion pattern.

SUMMARY OF THE INVENTION

In the system according to this invention no inversion pattern for synchronization purposes is used, but the beginning of the system cycle is marked by the transmission of an "alpha" signal in the first system cycle rotation which "alpha"-signal has the same function as the "I"-signals transmitted in all the system cycle rotations except the first cycle rotation.

Also according to this invention the conversion of the non-protected code signals into protecting code signals and the transmission of these signals is carried out in such a manner that never more than six 0-bits can follow each other immediately in a signal or in a group of signals transmitted.

Furthermore the non-protected code signals led to the system are converted, before transmission, into self-protecting code signals having a constant ratio of 0-bits and 1-bits by means of simple means which are uniform for all the codes to be treated, irrespective of the numbers of elements of these codes. In this conversion a certain number of the elements of each signal of all these codes are treated on a uniform basis. This number corresponds to the number of elements in the signals of the code having the smallest number of elements.

According to this invention transmission takes place in system cycles and in some cases in a repetition cycle the transmission of signals "I" may be replaced by the transmission of another type of special service signal such as an "alpha"-signal. Also the go path and the return path are worked at different telegraphic speeds so that there are no additional difficulties connected with synchronization.

The conversion of the signals of the non-protected five units code into signals of a self-protecting seven units code will be described first and is the basis for the following conversions of the six- to the eight-, the seven- to the ten-, and the eight- to the eleven-unit codes described thereafter. This basic conversion pattern can then be used in its entirety, in its "normal" or in its "inverted" form, for the conversion of five-unit groups in the signals of the non-protected codes having more than five elements per signal namely, the six-, seven-, and eight-unit codes. The elements contained in the non-protected code signals in excess of the said five elements and preceding these five elements are taken over unchanged in the protected code signals, and it is these excess elements that determine whether the five element group treated by the basic conversion pattern will be transmitted normal or inverted.

When a non-protected five-element code signal is converted into the seven-element code signal required, the five elements of the former signal are as a rule taken over unchanged in the positions two to six of the latter, although there are seven exceptions determined by further requirements set. As a rule the first position is taken by a 1-bit, to which rule the above-mentioned seven signals and seven more signals form exceptions. The signal is completed by a 1-bit or a 0-bit in the seventh position, in such a way that every signal transmitted contains four 1-bits. Further it is possible to invert the signals, so that every signal transmitted contains three 1-bits.

When signals of a non-protected six-unit code are converted, the first element is taken over unchanged as the first element in an eight-unit code. The conversion of the second to sixth elements of the six-unit signals are effected in the same way as the five elements of the five-unit code into the second to sixth elements of the seven-unit code. Notably if the first element of the six-unit code is a 0-bit, the further seven elements resulting from the conversion of its remaining five-unit group of elements will be transmitted normal, whereas if the first element is a 1-bit, said further seven elements will be transmitted inverted, so that each eight-unit signal transmitted contains four 1-bits.

When signals of a non-protected seven-unit code are converted, the first and second elements are taken over unchanged as second and third elements in a ten-unit code, which two elements are preceded by a 0-bit as the first element if they are both 1-bits or if the second element is a 1-bit and the third is a 0-bit, whereas these two elements are preceded by a 1-bit as the first element, if they are both 0-bits or if the second element is a 0-bit and the third is a 1-bit. The conversion of the third to seventh elements of the seven-unit code are then effected in the same way as the conversion of the five elements of the five-unit code into the second to sixth elements of the seven-unit code. Notably, if the second and the third elements are both 0-bits or if the second element is a 1-bit and the third is a 0-bit, the further seven elements resulting from the conversion of its remaining five-unit group of elements will be transmitted normal, whereas, if the second and the third elements are both 1-bits or if the second element is a 0-bit and the third is a 1-bit, said further seven elements will be transmitted inverted, so that each ten-unit signal transmitted contains five 1-bits.

When signals of a non-protected eight-unit code are converted, the first, second and third elements are taken over unchanged (with but one exception) as the second, third and fourth elements in an eleven-unit code, which three elements are preceded by a 1-bit as the first element, if they exhibit one of the three combinations 000, 001, or 111, whereas in all the other cases they are preceded by a 0-bit. The conversion of the fourth to eighth elements of the eight units code are then effected in the same way as the conversion of the five elements of the five-unit code into the second to sixth elements of the seven-unit code. Notably if the second, third and fourth elements exhibit one of the three combinations 000, 100, or 010, the further seven elements resulting from the said conversion of its remaining five-unit group of elements will be transmitted normal, whereas in the case of all the other combinations of the first three elements of the eleven-unit code, its remaining seven elements will be transmitted inverted, so that each eleven units signal transmitted contains five 1-bits. Also it is possible to transmit these eleven-unit signals inverted, so that each signal contains six 1-bits.

For re-phasing the stations according to this invention, a synchronizing cycle consisting of an "alpha"-signal followed by service signals "I" is transmitted, with the "alpha"-signal occupying the first rotation or signal position of the group of signals in the system cycle.

The correct reception of a signal or of a group of signals is reported by transmitting reversals, whereas in the case of incorrect reception of a signal or of a group of signals the reversals are inverted. Further the duration of a complete reversal on the return path is equal to the duration of a complete signal on the go path.

BRIEF DESCRIPTION OF THE VIEWS

The above mentioned and other features, objects, and advantages, and the manner of attaining them are described more specifically below by reference to an embodiment of this invention shown in the accompanying drawings, wherein:

FIG. 1 shows three tables for the conversion of five-unit non-protecting binary code signals into seven-unit protecting code signals;

FIG. 2 discloses a table of how six-unit non-protecting code signals can be converted into eight-unit protecting code signals similar to the conversion shown in the tables of FIG. 1;

FIG. 3 is a conversion table of how seven-unit non-protecting code signals can be converted into ten-unit protecting code signals;

FIG. 4 is a conversion table of how an eight-unit non-protecting code of signals can be converted into an eleven-unit protecting code of signals;

DETAILED DESCRIPTION OF PREFERRED EMBODIMENT

Figure 5:
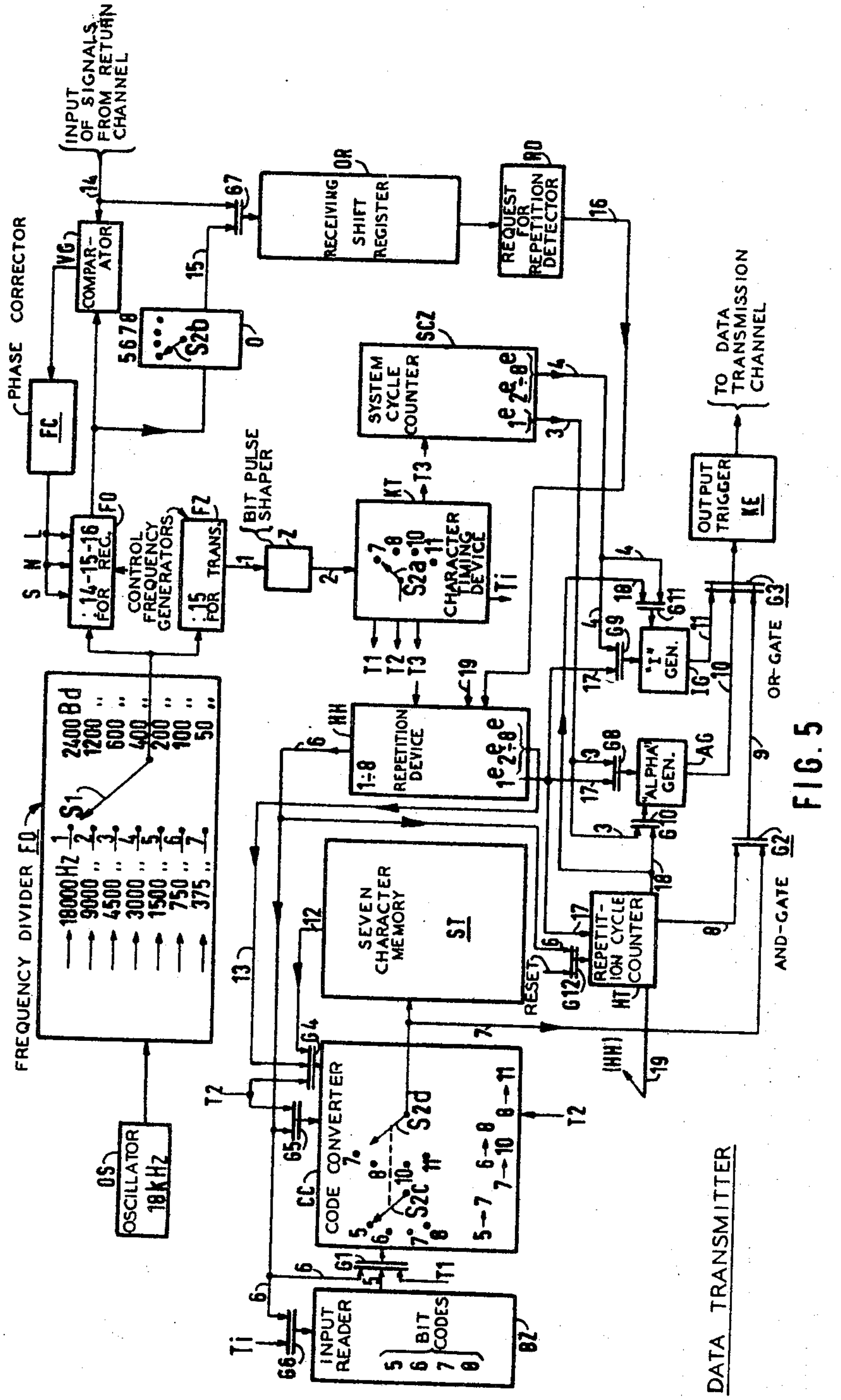
FIG. 5 is a block wiring diagram of a data transmission circuit for codes shown in FIGS. 1 through 4.

The invention will now be described with reference to the figures.

CODE CONVERSIONS

FIG. 1 consists of three tables concerning the conversion of the signals of a five-unit non-protecting code into signals of a seven-unit protecting code.

In the left-hand five columns IB of Table 1 is the five-unit code and in the right-hand seven columns is its converted seven-unit code. As a first rule, the five elements of the five-unit signals are taken over unchanged in the positions two to six of the seven-units signals. To this rule there are seven exceptions, indicated by the "X's" at the right of columns IB in Table 1, which seven signals are also shown in Table 2. These seven signals cannot be converted according to this first set rule, because of the possibility that, contrary to a further set rule, more than six 0-bits might follow each other in a group of signals transmitted.

As a rule the first element in the seven-unit signal is a 1-bit (see the non "X"-ed signals in Table 1). The seven signals shown in Table 2 are expected from this rule, as well as are seven more signals shown in Table 3 and indicated by "XX" in Table 1. In each of these fourteen excepted signals the first element of the converted signal is a zero-bit. Table 1 also contains three service signals, "I," "$\beta$" and "$\alpha$," which also are used in the seven-units code.

In FIG. 2 the left-hand six columns show a number of signals of a non-protected six unit code, and the right-hand eight columns show the corresponding eight-unit signals. During the conversion, the first element is taken over unchanged as first element in the eight-units signal. The conversion of the second to sixth elements is effected in the same way as the conversion of the five elements of the five-unit code in FIG. 1 into the second to sixth elements of the seven-unit code. If the first element is a 0-bit, its remaining seven elements resulting from this conversion will be transmitted normal, whereas if the first element is a 1-bit, its remaining seven elements will be transmitted inverted. Thus each eight-units signal transmitted contains four 1-bits. Further the table shows four service signals, as are used in the eight-unit code.

In FIG. 3 the left-hand seven columns show the signals of a nonprotective seven-unit code, the ten right-hand columns show the corresponding ten-unit signals. During the conversion, the first and second elements are taken over unchanged as second and third elements in the ten-unit code. These two elements are preceded by a 0-bit as the first element, if they are both 1-bits or if the second element of the ten-unit signal is a 1-bit and the third is a 0-bit; whereas they are preceded by a 1-bit as the first element, if they are both 0-bits or if the second element is a 0-bit and the third is a 1-bit. The conversion of the third to seventh elements of this seven-unit code is effected in the same way as the conversion of the five elements of the five-unit code of FIG. 1 into the second to sixth elements of its seven-unit code. If the second and the third elements of this ten-unit code are both 0-bits or if the second element is a 1-bit and the third is a 0-bit, its remaining seven elements resulting from this conversion will be transmitted normal; whereas if the second and the third elements of this ten-unit code are both 1-bits or if the second element is a 0-bit and the third is a 1-bit, its remaining seven elements will be transmitted inverted. Thus each ten-unit signal transmitted contains five 1-bits.

In FIG. 4 the left-hand eight columns show the signals of a nonprotected eight-unit code, and the right-hand eleven columns show the corresponding eleven-unit signal. During the conversion the first, second, and third elements are taken over unchanged as second, third and fourth elements in the eleven-unit code. To this rule there is one exception, shown at the bottom of FIG. 4. These first three elements of this eight-unit code are preceded by a 1-bit as the first element if they exhibit one of the three combinations 000, 001, or 111, whereas in all the other cases they are preceded by a 0-bit. The conversion of the fourth to eighth elements of this eight-unit code is effected in the same way as the conversion of the five elements of the five-unit code into the second to sixth elements of the seven-unit code (see FIG. 1 Table 1). If the second, third and fourth elements of the eleven-unit code exhibit one of the three combinations 000, 100, and 010, its remaining seven elements resulting from this conversion will be transmitted normal, whereas in all the other cases its remaining seven elements will be transmitted inverted. Thus each eleven-unit signal transmitted contains five 1-bits.

TRANSMITTER

FIG. 5 shows a schematic block wiring diagram for a transmitter. A crystal oscillator OS delivers a frequency of 18,000 c./s. to a frequency divider FD, by means of which the following frequencies can be obtained in the positions indicated below in parenthesis of the switch S1:

18,000 c./s. directly from the oscillator OS (1)
9000 c./s. by division through 2 (2)
4500 c./s. by division through 4 (3)
3000 c./s. by division through 6 (4)
1500 c./s. by division through 12 (5)
750 c./s. by division through 24 (6)
375 c./s. by division through 48 (7)

By setting the switch S1 in one of the seven positions, one of the above-mentioned frequencies is chosen and led to the control frequency generator FO (for the receiver) and FZ (for the transmitter), after which, by division by 15, the frequency obtained is representative for the chosen telegraphic speed of 1200, 600, 400, 200, 100 or 50 bauds.

The output 1 of control frequency generator FZ controls the bit pulse shaper Z, which marks off the elements by bit pulses, which are applied via the conductor 2 to a character timing device KT. As determined by the position 7, 8, 10 or 11 of the switch S2$a$, this device KT counts off 7, 8, 10 or 11 bits, thus causing a character pattern (cf. FIG. 7, wave forms (12) through (15)) to appear on the output terminals corresponding to pulses T1, T2, T3 and T$i$. The pulse T3 controls a system cycle counter SCZ which counts off eight character cycles, so that a pulse appears on its terminal 3 during the first character cycle of each system cycle and on its terminal 4 during all the other character cycles of each system cycle. The frequency dividers of the system cycle counter SCZ control the transmitter of the data set.

The data are supplied e.g. by means of a tape reader BZ, which can read 5, 6, 7 or 8 units per signal from the tape or from cards, and passes this information via a multiple connection 5 to an AND-gate G1. When the timing pulse T1 appears and the free criterion is supplied by the repetition device HH via the conductor 6, this AND-gate G1 passes the information to the code converter CC in which it is determined by means of the switches S2$c$ and S2$d$ if a conversion from 5 to 7, from 6 to 8, from 7 to 10, or from 8 to 11 elements will be carried out during the pulse T2. This pulse T2 appears immediately after the pulse T1, see wave forms (13) and (14) in FIG. 7.

If the repetition cycle counter HT has not yet counted two successive repetition cycles, the potential on the conductor 8 allows the passage of the information from the output conductor 7 of the code converter CC via the AND-gate G2 to the conductor 9 to control the OR-gate G3. The output of this OR-gate G3 controls the output trigger KE, which controls the data transmission channel.

The information delivered by the output conductor 7 of the code converter CC is also supplied to the seven character memory ST. Consequently, this memory ST always contains the last seven signals transmitted, to a maximum of 77 bits. These signals can be found on the output conductor 12 with a delay of six characters. They can be supplied again to the code converter CC via the AND-gate G4 and recorded once more in the memory ST via the conductor 7. The AND-gate G4, however, only lets pass the information from the memory ST at the moments when a pulse T2 occurs in the second to eighth character cycles of the repetition cycle. When signals are taken over from the memory ST, no information can be delivered by the tape reader BZ, because the AND-gate G1 is blocked via the conductor 6. At the same time the tape transport impulse is interrupted, because the transport pulse T$i$ is blocked at the AND-gate G6.

The signals received via the conductor 14 from the return channel are reversals (i.e. alternating A and Z polarities with each polarity lasting half the time duration of the character in the data channel) and are recorded successively in the receiving shift register OR, as timed by the shift pulses appearing via the conductor 15 at its input AND-gate G7.

When the data receiving station has received an error, the phase of the said reversals is changed by 180 degrees. As a result of this change of phase, the input trigger of the request for repetition (or RQ) detector RD is not changed over when the shift pulse appears on the conductor 15.

Via the conductor 16 the RQ detector RD starts the repetition device HH, which, once started, counts off eight character cycles and applies a blocking potential via the conductor 6 to the AND-gates G5 and G6 during all these eight character cycles.

During the first character cycle 1$e$ the repetition cycle counter HT is started via the conductor 17 and an opening potential is applied to the AND-gates G8 and G9.

If during the first character cycle of the repetition cycle the system cycle counter SCZ is also in the first character cycle position, the AND-gate G8 is opened via the conductor 3, due to which the alpha-generator AG produces the "alpha"-signal.

Via the conductor 10 the "alpha"-signal opens the OR-gate G3 so as to control the output trigger KE, which thus ensures the transmission of the alpha signal.

If the first character cycle of the repetition cycle does not coincide with that of the system cycle, the AND-gate G8 is blocked, whereas, via the conductor 4, the AND-gate G9 is opened with a view to the control of the "I"-signal generator IG, which delivers the "I"-signal to be transmitted via conductor 11 to OR-gate G3. The next seven character cycles of the repetition cycle are used for retransmitting, via the conductor 7 and the AND-gate G2 and OR-gate G3, the seven last signals transmitted, which are supplied again to the code converter CC from the memory ST.

If after the repetition cycle no fresh request for repetition or RQ signal has been discovered or detected, a reset pulse will restore the repetition cycle counter HT to the initial state via the OR-gate G12.

If after the repetition cycle another RQ signal is detected, the repetition device HH is started again, the repetition cycle counter HT records two successive repetition cycles and, via the conductor 8, blocks the AND-gate G2 so that no further data can be transmitted until the repetition cycle counter HT has come into the synchronizing position.

Via the conductor 18 the AND-gates G10 and G11 are opening now, so that an "alpha"-signal will be generated during the first character cycle, and signals "I" during the further character cycles of the system cycle.

Then the output trigger KE transmits synchronizing cycles, by means of which the data receiving station can be re-phased. The transmission of these cycles goes on until the request for repetition detector RD detects no further requests for repetition or RQ signals. Thus the repetition cycle counter HT resumes the initial state, the AND-gate G2 is re-opened and the AND-gates G10 and G11 are blocked.

At the resetting moment of the repetition cycle counter HT from the synchronizing position, a pulse is passed via the conductor 19 to the repetition device HH which reacts as if a repetition had been asked. This means that a series of synchronizing cycles is always followed by a repetition cycle.

Figure 6:
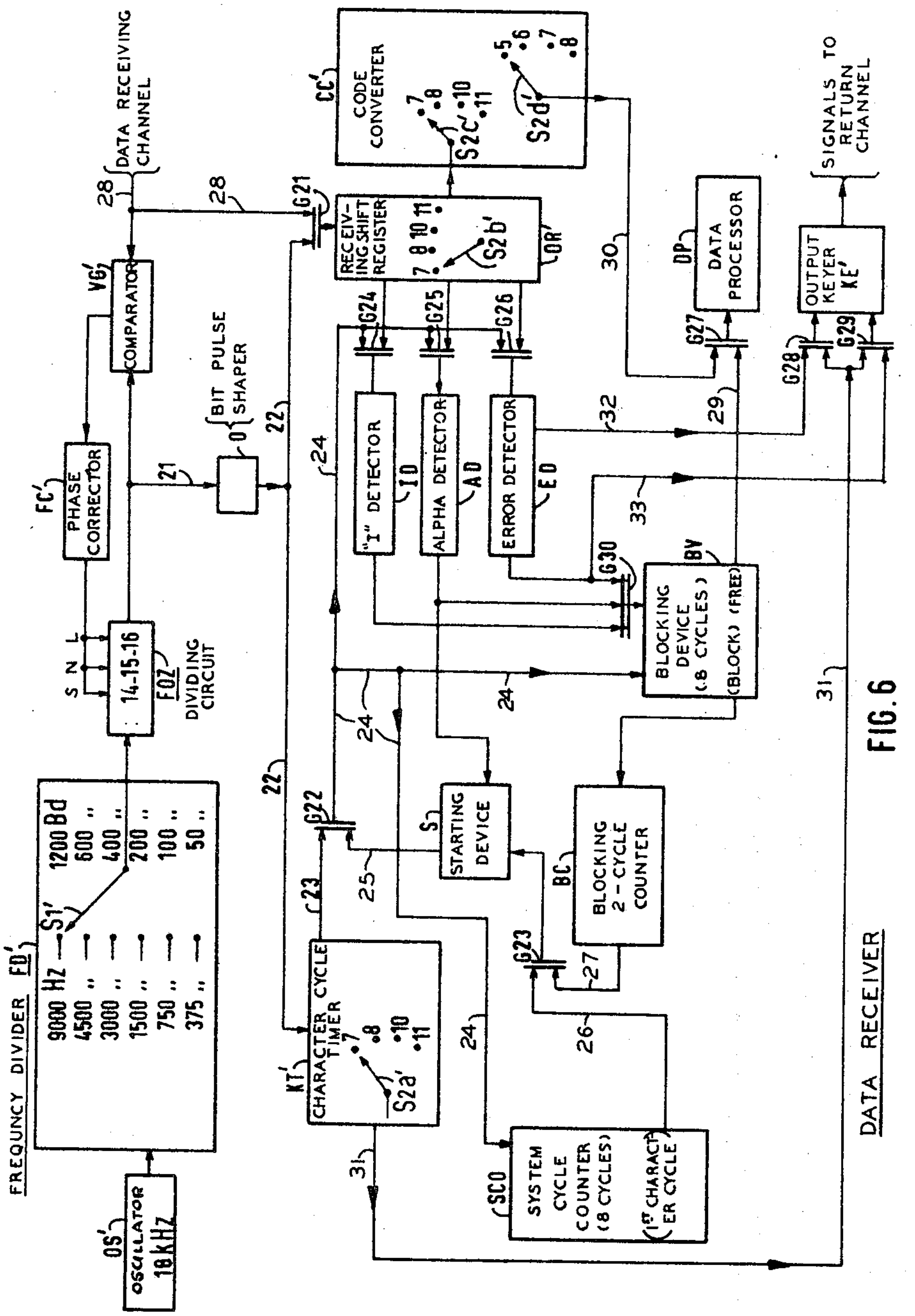
FIG. 6 is a block wiring diagram of a data receiver circuit for receiving the data transmitted by the transmitter shown in FIG. 5.

FIG. 6 receiver is a schematic block wiring diagram of a data receiving station. Like the data transmitting station in FIG. 5, he data receiving station possesses a crystal oscillator OS′ and frequency division stages FD′ having means for adjusting telegraphic speeds of 1200, 600, 400, 200, 100 and 50 bauds.

A dividing circuit FOZ provides the control frequency for the receiving distributor (conductor 21) and times the transmitting of the reversals. The bit pulse shaper O passes bit pulses via AND-gate G21 to the receiving shift register OR′ via the conductor 22 and to the character timing device or character cycle timer KT′, which determines the character length in accordance with the position of the switch S2*a*′. The shift register OR′ is adjusted to the character length chosen by means of the switch S2*b*′. Once in every character a pulse is passed from the character cycle timer KT′ via the output circuit 23 and the AND-gate G22 via conductor 24 to the blocking device BV, as well as to the three AND-gates G24, G25, and G26.

The character timing pulse from AND-gate G22 is also applied via conductor 24 to the system cycle counter SCO, which always counts off eight character cycles. The AND-gate G22 is conducting, when the conductor 25 has the potential supplied by the starting device S in its ON-condition.

The first character cycle recorded by the system cycle counter SCO opens the AND-gate G23 (via the conductor 26), when from the blocking cycle counter BC, via the conductor 27, the blocking potential is applied to it, indicating that two successive blocking cycles have been counted. Via the AND-gate G23 the starting devises can be put in the OFF-state, but this can only be done in the first character cycle of a system cycle. When this happens, the AND-gate G22 is blocked, so that no further character timing pulses can be passed on. The blocking device BV remains in the character cycle coinciding with the first character cycle of the system cycle counter SCO so that the system cycle counter SCO remains in the first character cycle of the system cycle.

Only the bit pulses on the conductor 22 continue, so that all the information received on the input conductor 28 from the data receiving channel is recorded in the shift register OR′.

When the alpha-detector AD detects an "alpha"-signal stored in the shift register OR′, the starting device S is started again in the first character cycle of the system cycle. The blocking device too goes on counting off blocking cycles in the correct phase of the system cycles.

If during the reception of information, the error detector ED detects an error, the alpha detector AD detects an "alpha"-signal, or the "I"-signal detector ID detects a I-signal, the blocking device BV is started via the OR-gate G30. Once started, it counts eight character cycles indicated by the character timing pulses via conductor 24, after which the blocking device BV is restored to the free state, unless after the repetition cycle another error, another "I"-signal, or another "alpha"-signal is received.

When the blocking device BV is in the blocking state, the AND-gate G27 is blocked by means of the conductor 29, so that the decoded information cannot be passed on from the conductor 30 from the receiving shift register OR′ through the code converter CC′ to the data processor DP.

The output keyer KE′, which transmits reversals of the bits which have the duration of half an information character, is normally controlled via the conductor 31 and the AND-gate G28. In that case the potential on the conductor 32 is such that the AND-gate G28 is conducting. When, however, the error detector ED detects an error, a forward voltage is applied via the conductor 33 to the AND-gate G29, so that this gate G29 becomes conducting, applying the reversals from the conductor G31 in the opposite phase to the output keyer KE. This goes on until the error detector ED is at normal again, i.e. when transmission goes on normally again and no further errors are detected.

So error signalling is effected by transmitting the reversals in the opposite phase when an error is detected.

Figure 7:
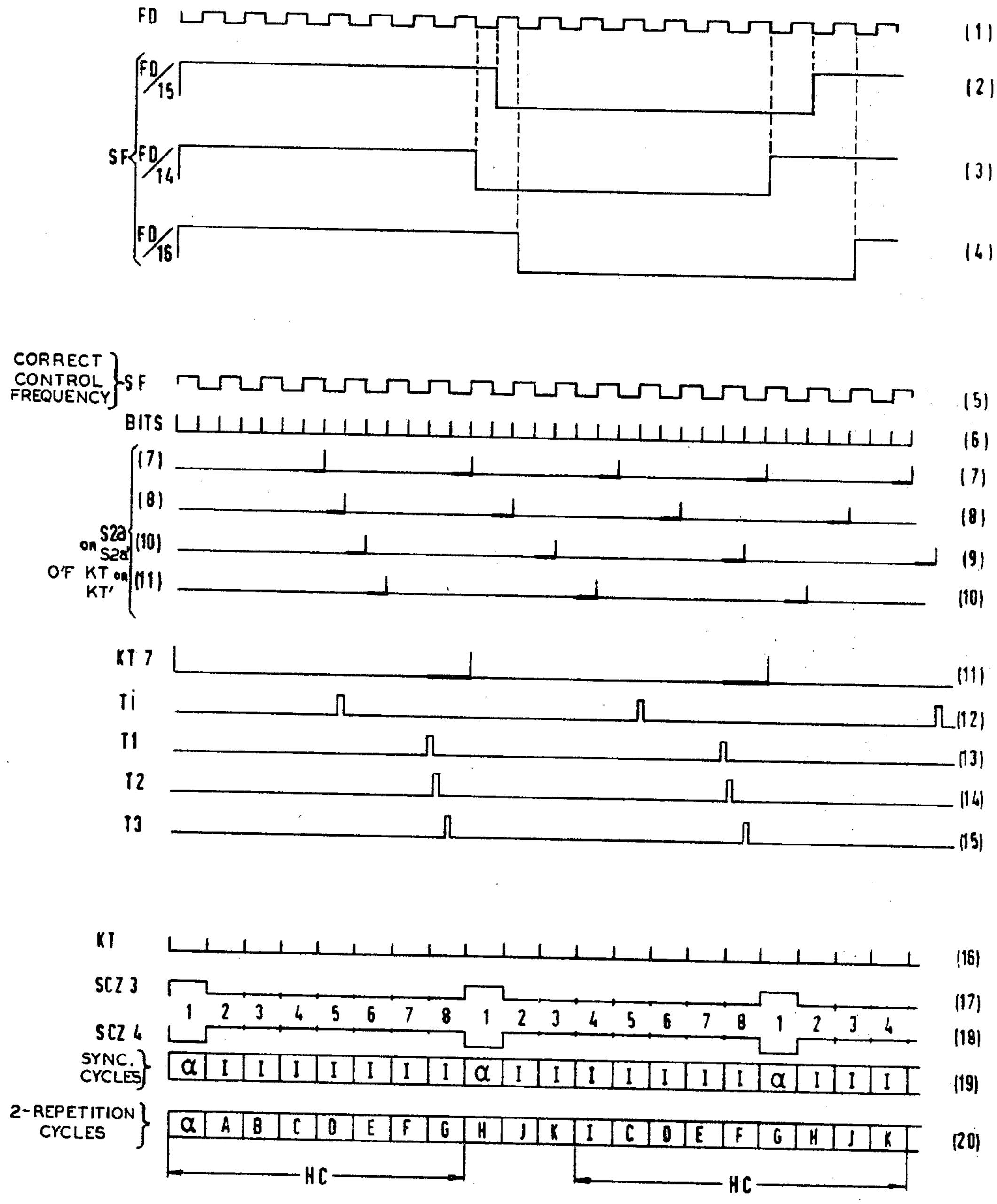
FIG. 7 shows several wave form diagrams of the pulses which occur in some of the circuits shown in FIGS. 5 and 6.

FIG. 7 shows wave form time diagrams of the various timings and time relations of the pulses in some of the circuits of FIGS. 5 and 6.

Wave form (1) shows the output voltage of the frequency dividing stages FD and FD′. Wave form (2) shows the output of the conductor 1 of control frequency generator FZ, the frequency being that of wave form (1) divided by 15. This is the control frequency of the transmitter shown in FIG. 5.

If in the receiver, the comparator VG′ finds that the signal received is not in phase with the control frequency from the control frequency generator FO or dividing circuit FOZ, the phase corrector FC or FC′, respectively, produces a phase correcting pulse. If the received signal lags, the correcting pulse will be an L pulse due to which the frequency divider FD or FD′ frequency is not divided by 15 but by 16 and the control frequency generator FO and dividing circuit FOZ output frequency SF is momentarily delayed, see wave form (4). If the received signal leads, however, an S-pulse is produced, which causes a division by 14 of the frequency divider FD or FD′ frequency, which amounts to a momentary increase in this output frequency SF, see wave form (3).

Wave form (5) shows the control frequency, SF phase corrected or not. Bit pulses are derived from the edges of the square waves of the control frequency SF, see wave form (6). The character cycle timer KT or KT′ gives output pulses as shown in lines (7), (8), (9) and (10), as determined by the character length chosen. This is shown in the enlarged scale on wave form (11), in which the last bit period is indicated by a heavy horizontal line. It is in that period that the pulses T1, T2 and T3 appear, the sequence of these pulses being shown in wave forms (13), (14) and (15).

Wave forms (17) and (18) show the output voltages of the system cycle counter SCZ. Wave form (19) shows the special signals "α" and "I" transmitted during the transmission of a synchronizing cycle. Wave form (20) shows two repetition cycles indicated by HC. In one of these cycles the first character cycle coincides with the first signal of the system cycle, so that the "I"-signal is changed into an "alpha"-signal. In the other repetition cycle there is no such coincidence, so that the "I"-signal remains unchanged.

We claim:

1. A telecommunication system for non-protecting multi-element binary code signals of different multi-element binary codes between a traffic transmitter and a traffic receiver, said transmitter and said receiver each comprising:

(a) a code converter (CC, CC′) for converting the signals in all of said different codes into corresponding protecting multi-element code signals having a constant ratio of the two different types of elements making up each signal;

(b) means for generating control frequencies (FD+, FD′+) for the elements of the codes converted;

(c) means connected to said generating means for correcting (FC+, FC′+) the phase of the elements of the signals received with the phase of the elements of the signals transmitted;

(d) means connected to said generating means for counting (KT, KT′) the elements of each converted signal, and (e) means connected to said counting means for dividing (SCZ, SCO) the traffic signals into groups of a predetermined number of signals and counting the successive signals in each group for insuring signal synchronization between the transmitter and the receiver;

said transmitter comprising:

(f) means connected to its associated code converter for storing (ST) the last group of signals transmitted;

(g) means for detecting (RD) a request for a repetition from said receiver;

(h) means connected to said detecting means for starting a repetition cycle (HT, HH) of the same number of signals in said group when said request for repetition is detected, and (i) means connected to its associated dividing means for generating (AG, IG) special service signals for indicating the start of each said group and the start of a repetition cycle of signals from said storing means; and said receiver comprising:

(j) means for detecting (ED, ID, AD) errors in each traffic signal and said special service signals, and (k) means connected to and responsive to said error detecting means for blocking (BV, BC) the output of said receiver until the error is corrected and the signals in said groups are in synchronism.

2. A system according to claim 1 wherein said means for generating said special service signals includes means (G8, G9) for indicating the start of a repetition cycle with a different special service signal when its start coincides with the start of a said group than when its start does not coincide with the start of a said group.

3. A system according to claim 1 wherein said transmitting means includes a tape reader.

4. A system according to claim 1 wherein said receiving means includes a data processor.

References Cited

UNITED STATES PATENTS

| | | | |
|---|---|---|---|
| 2,653,996 | 9/1953 | Wright | 178—23 |
| 2,703,361 | 3/1955 | Van Duuren | 340—146.1 X |
| 2,805,278 | 9/1957 | Van Duuren | 340—146.1 X |
| 2,993,956 | 7/1961 | Steeneck | 178—23 |
| 3,001,018 | 9/1961 | Van Dalen | 178—23 |
| 3,005,871 | 10/1961 | Rudolph | 340—156.1 X |
| 3,157,767 | 11/1964 | Van Duuren et al. | 340—146.1 X |
| 3,381,271 | 4/1968 | Van Duuren | 340—146.1 |
| 2,970,189 | 1/1961 | Van Dalen, et al. | 340—146.1 X |

EUGENE G. BOTZ, Primary Examiner

C. E. ATKINSON, Assistant Examiner

U.S. Cl. X.R.

178—23

(Our Ref. P 169/125)

PO-1050
(5/69)

UNITED STATES PATENT OFFICE
CERTIFICATE OF CORRECTION

Patent No. 3,528,057 Dated Sept. 8, 1970

Inventor(s) H. C. A. Van DUUREN et al

It is certified that error appears in the above-identified patent and that said Letters Patent are hereby corrected as shown below:

Column 4, line 26, after "As" insert -- second set -- ; line 28, "expected" should read -- excepted --. Column 6, line 69, "cyn-" should read -- syn- --; line 72, "opening" should read -- opened --. Column 7, line 14, cancel "receiver"; between lines 13 and 14 insert -- Receiver --; line 46, "vises" should read -- vice S --. Column 8, line 46, "lines" should read -- wave forms --; line 48, "in the" should read -- on an -- ; "on" should read -- in the --.

SIGNED AND SEALED
DEC 8 1970

(SEAL)
Attest:

Edward M. Fletcher, Jr.
Attesting Officer

WILLIAM E. SCHUYLER, JR.
Commissioner of Patents